C. FRIEDERICI.
LUBRICATOR FOR STEAM ENGINES.
No. 336,045. Patented Feb. 9, 1886.
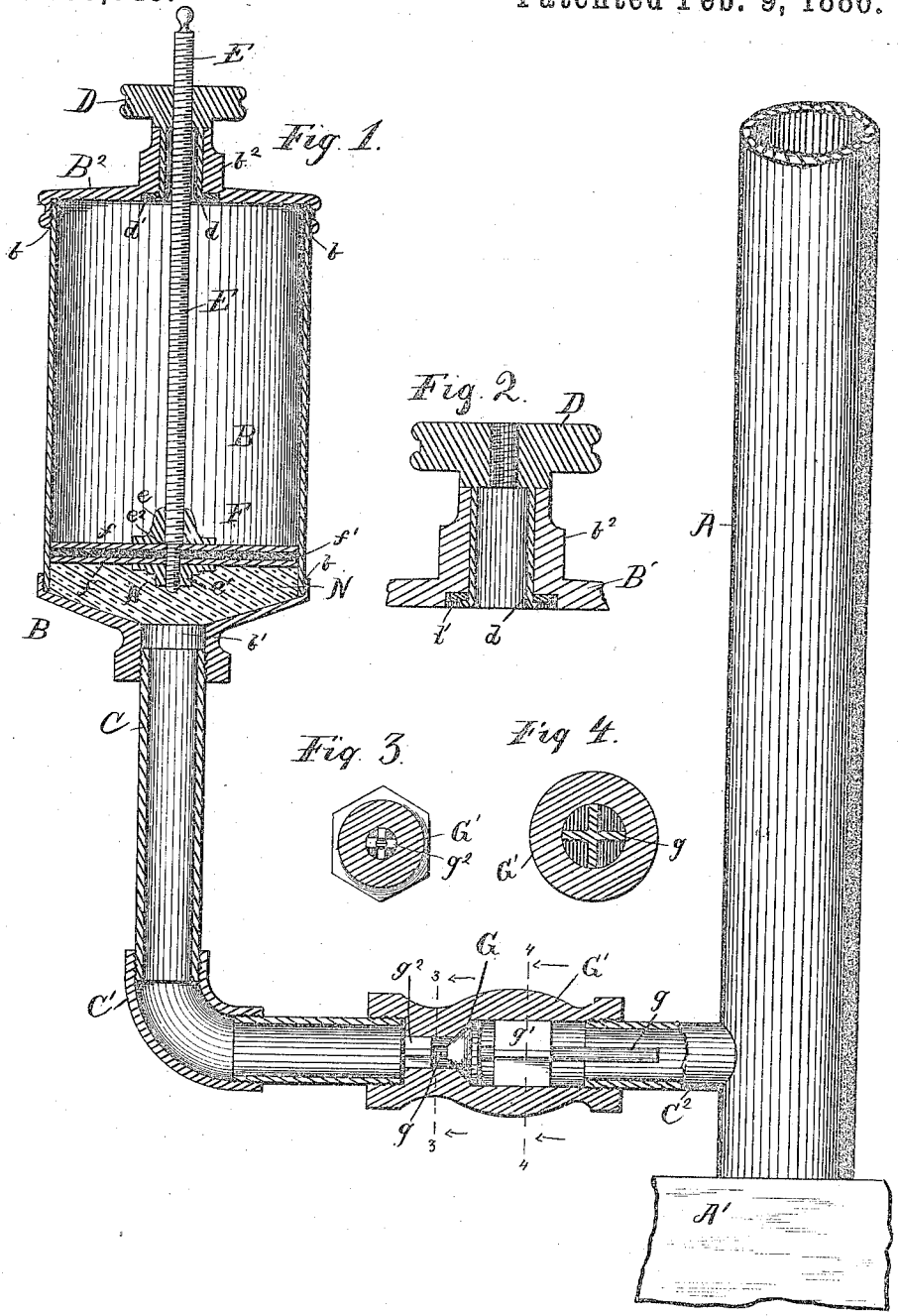

UNITED STATES PATENT OFFICE.

CHARLES FRIEDERICI, OF CHICAGO, ILLINOIS.

LUBRICATOR FOR STEAM-ENGINES.

SPECIFICATION forming part of Letters Patent No. 336,045, dated February 9, 1886.

Application filed December 18, 1885. Serial No. 186,047. (No model.)

*To all whom it may concern:*

Be it known that I, CHARLES FRIEDERICI, a citizen of the United States, residing in Chicago, in the county of Cook and State of Illinois, have invented a new and useful Improvement in Lubricators for Steam-Cylinders, of which the following is a specification.

This invention relates to devices operated by hand for lubricating steam-cylinders with grease or other thick soft semi-liquid lubricants which require to be forced out under pressure from the can or vessel, and which, owing to their non-liquid condition, cannot be readily put into the lubricant vessel or can through the ordinary openings.

The object of my present invention is to provide a practical and efficient oiler for solid or semi-liquid lubricants of a cheap and simple construction, and from which the grease can be readily forced with certainty and regularity under the required pressure, and which can be easily and conveniently refilled while permanently attached to the engine or its steam-pipe.

In my invention the can or cylinder which contains the grease is provided with a piston or plunger, the stem of which is made in the form of a screw and operated by a revolving nut journaled in the head of the can or cylinder, so that the piston may be operated up and down in the can or cylinder without revolving therein, and thus becoming worn and the operation of the lubricator thereby rendered uncertain. An automatic check-valve having a stem and guides on each end thereof permits the lubricant to enter the steam pipe or cylinder when the lubricant-piston is operated, and prevents the steam from entering the lubricant vessel or cylinder. To prevent the heat from the steam pipe materially affecting the lubricant in the vessel, a considerable length of pipe intervenes between the valve and the lubricant vessel.

My invention consists in the novel devices and novel combinations of parts or devices herein shown and described, and more particularly pointed out in the claims.

In the accompanying drawings, which form a part of this specification, and in which similar letters of reference indicate like parts, Figure 1 is a vertical central section of a device embodying my invention. Fig. 2 is an enlarged section of the revolving nut, and Figs. 3 and 4 are cross-sections on lines 3 3 and 4 4 of Fig. 1.

In said drawings, A may represent a steam-pipe leading to a steam chest or cylinder, A'. B is a lubricant vessel or cylinder having heads B' and B² removably secured thereon by screw-threads $b$. This cylinder is preferably made of brass, and the lower head, B', is cast with a central hole, $b'$, in which the lubricant-pipe C is secured by screw-threads. The upper head, B², of the cylinder is furnished with an elongated hub, $b^2$, having a smooth central hole or bearing for the revolving nut D of the screw-stem E, which operates the piston F. The piston F is preferably composed of two flat circular plates, $f$, with a rubber disk, $f'$, between them, and it is secured to the end of the screw-stem E by the threaded disks or nuts $e$ $e'$, which also serve to compress the disks $f$ $f$ and $f'$ together. The end of the stem E is furnished with a shoulder or offset, $e^2$, and the bore of the nut $e'$ is smaller than that of the nut $e$. The revolving nut D is furnished with a sleeve, $d$, which fits in and projects through the hole or bearing in the elongated hub $b^2$ of the head B², and the lower end of this sleeve is turned or riveted over a collar, $d'$, fitting in a channel or offset on the under surface of the head B², so that the nut D may revolve freely, and thus elevate or depress the piston. By this means a tight joint may be secured between the revolving nut and the head B², while the nut is free to revolve therein. The lubricant-pipe C is provided with an elbow, C', and it should be eight or ten inches in length between the lubricant-vessel and the check-valve G. This valve G is provided with a stem, $g$, having cross-shaped guides $g'$ $g^2$, one at each end, which travel in the bore of the valve-chamber G' and serve to guide the valve centrally to its seat. The bore at the rear end of the valve-chamber is threaded and receives the threaded end of the pipe-section C², the end of which pipe serves as a shoulder or stop to limit the movement of the valve-guide $g'$. The pipe-section C² is secured to the steam-pipe, and thus supports the lubricator.

To fill the cylinder B with the solid lubricant, the piston is first run up to the top by turning the nut D, and then the cylinder is unscrewed from the lower head, B', and filled, when it is again inverted and screwed upon the head B'. The screw-stem E serves not only to raise and lower the piston by revolution of the nut D, but also to indicate when the lubricant N is exhausted in the vessel or cylinder B.

I claim—

1. The combination, with valve-chamber G', of valve G, having stem $g$ and guides $g'$ $g^2$, lubricant-pipes C, lubricant cylinder or vessel B, bearing heads B' B$^2$, the former secured to said pipe C, piston F, screw-stem E, and revolving nut D, journaled in said head B$^2$, substantially as specified.

2. The combination, with a check-valve, of a lubricant-pipe and a lubricant-vessel provided with a piston having a screw-stem and revolving threaded nut journaled in the head of said lubricant-vessel for operating said screw, whereby said piston may be forced up or down without communicating any revolving motion thereto or to the operating-screw, substantially as specified.

3. The combination, with a lubricant vessel or cylinder, B, a piston therefor, and a screw-stem secured to said piston, of a revolving threaded nut journaled in the head of said cylinder for operating said screw-stem, whereby said piston may be forced up or down without revolving the piston in the cylinder or the screw in the piston, substantially as specified.

4. The combination, with cylinder B, having heads B' B$^2$, said head B$^2$ having a hub, $b^2$, of piston F, screw-stem E, revolving nut D, having sleeve $d$, journaled in said hub, and collar $d'$, secured to said sleeve $d$, substantially as specified.

CHARLES FRIEDERICI.

Witnesses:
EDMUND ADCOCK,
EDW. S. EVARTS.